UNITED STATES PATENT OFFICE.

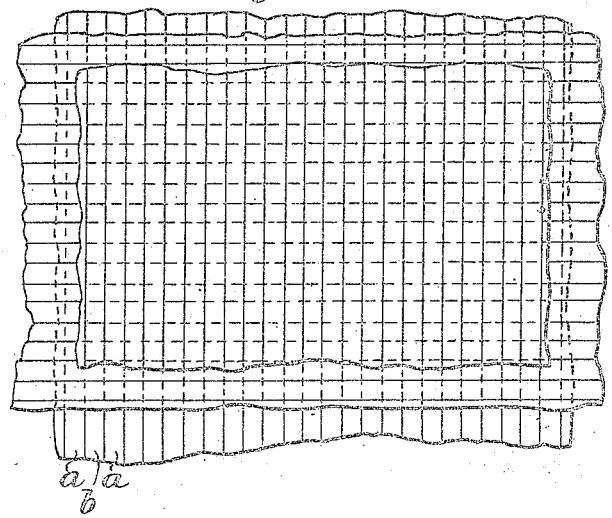
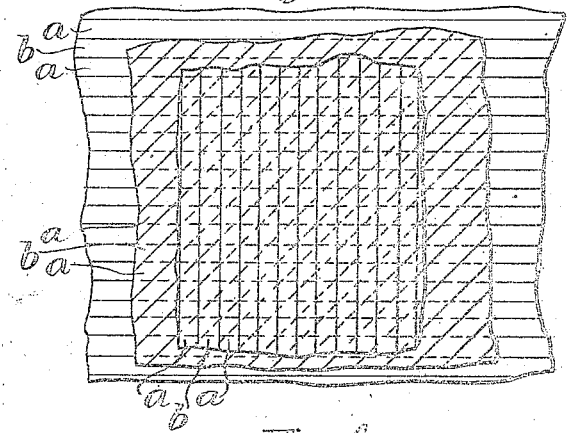
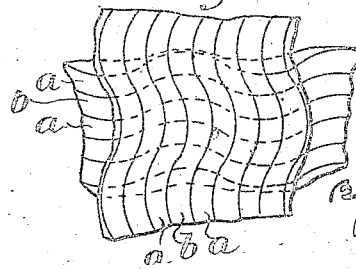

WALTER PERCY WHITEHOUSE, OF WHITSTABLE, ENGLAND.

CONSTRUCTION OF WEAR-RESISTING AND NONSLIPPING SURFACES, SUCH AS TIRE COVERS, STAIR TREADS, OR THE LIKE.

1,426,800. Specification of Letters Patent. Patented Aug. 22, 1922.

Application filed August 31, 1921. Serial No. 497,572.

(GRANTED UNDER THE PROVISIONS OF THE ACT OF MARCH 3, 1883, 41 STAT. L., 1313.)

*To all whom it may concern:*

Be it known that I, WALTER PERCY WHITEHOUSE, a subject of the King of Great Britain, residing at 16 Westmeads Road, Whitstable, Kent, England, have invented new and useful Improvements in the Construction of Wear-Resisting and Nonslipping Surfaces, such as Tire Covers, Stair Treads, or the like, (for which I have filed application in England July 28, 1920, Patent No. 170,928), of which the following is a specification.

This invention relates to an improved manufacture of articles such, for example, as wheel tires, or tire covers, composed of rubber of different degrees of hardness.

According to the invention I build up rubber articles such as tires, stair treads, roadway pavings, or other articles or the like of a series of sheets, each of which is composed of a series of strips or threads of rubber of two or more degrees of hardness or resilience. The series of sheets, composed as above described, is built up in such a manner that the strips or threads composing each sheet cross those composing adjacent sheets at an angle. Textile fabric or yarn, such as is commonly employed in connection with rubber articles, may also be made use of in my improved manufacture.

The strips or threads may, in practice, be of any suitable cross-section, and may be uniform or not in section, and symmetrically or unsymmetrically arranged relatively to one another.

The strips or threads, and the sheets made therefrom, may be produced by means of the machinery and methods at present in use.

It will be understood that in all cases the strips or threads of different degrees of hardness or resilience are arranged at right angles, or practically at right angles, to the direction of the forces causing wear; for example in the case of a stopper, the strips or threads will be arranged with their faces at right angles to the axis of the stopper, so as to present their ends or edges to the neck of the bottle with which the stopper frictionally engages.

The invention may be applied with benefit to a large variety of rubber articles, and advantage may be taken of the varying qualities of rubber for particular adaptations.

In the accompanying drawing—

Figure 1 is a plan view of one form of my invention.

Fig. 2 is a cross section of Fig. 1, and

Figs. 3 and 4 are plan views of two other forms of the invention.

Referring to the drawings, $a$, $b$ indicate alternate strips of rubber of different degrees of resiliency or hardness of which each layer or sheet is composed according to the invention, the whole being manipulated so as to adhere together and then vulcanized. The sheets are superposed so that the strips of adjacent layers cross one another at an angle. In Figures 1 and 2, the strips of the adjacent layers cross one another at right angles whilst in Figure 3 they cross at an angle of 45°. In Figure 4 the strips are shown of a sinuous form but they may be zig-zag or of other form such as square, triangular or circular, and an article may be composed of two or more such layers and the hardness or resilience of the strips may vary from those composing adjoining layers.

In applying the invention to the production of a stair tread, I may build up such tread entirely of sheets of strips as shown in Figures 2, 3 and 4, or in accordance with common practice I may pass a backing of textile fabric or calendered rubber of even consistency and of the required width and thickness through rolls simultaneously or in succession with two or more alternating layers or strips of rubber $a$, $b$ as in Figure 1, the pressure of the rolls causing the said strips to make union one to another and to the fabric or calendered backing. The resulting tread consists of the backing of the textile fabric or calendered rubber with a facing of the layers of alternating strips or bars of rubber of different degrees of resiliency. This strip so produced may be vulcanized and applied to stairs in the usual way.

A modified mode of producing the sheets composed of alternating strips consists in winding or rolling the strips round a suitably shaped bar and then either introducing them into a mould or covering them with an extruded lead sheath which is subsequently removed when cutting into sheets. By placing side by side two sheets obtained in this way, a herring-bone pattern may be obtained for the strips $a$, $b$, vulcanization being effected in one or more stages of the manufacture.

The strips of varying resiliency or hardness alternating, instead of being in sets of two, may be in sets of three or more different degrees of resiliency or hardness, such sets alternating with one another or they may be arranged in any other manner.

It will be understood that in all cases the strips of different degrees of hardness or resiliency are arranged at right angles, or practically at right angles to the direction of the forces causing wear.

Two or more layers may be used and my invention is well adapted for the manufacture of wheel tires, tire covers, hose pipes, stoppers, washers, packings, the soles and heels of boots, stair-treads, floor-coverings, paving-blocks, roadway surfaces, brake-bands, elevator and cable grips, and the like, such articles, exhibiting less tendency to cleavage which is a disadvantage commonly attaching to rubber articles as now made, and the surfaces of which are of a wear resisting and non-slipping nature.

Claim.

Wear resisting and non-slipping surfaces comprising two or more layers or sheets composed of strips of vulcanized rubber of different degrees of resiliency or hardness arranged side by side and adhering together, the strips of each layer crossing at an angle the strips of the adjacent layer or layers, substantially as described.

WALTER PERCY WHITEHOUSE.